Figure 1:
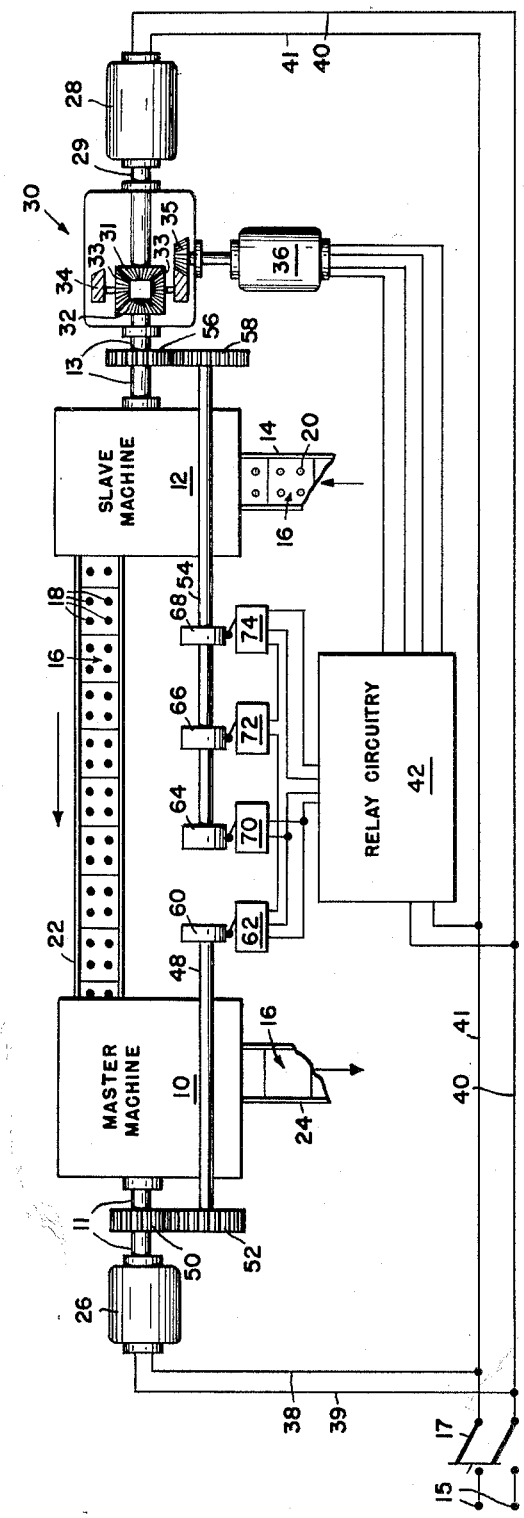

INVENTOR.
ALTEN E. WHITECAR
BY *Busser, Smith & Harding*
ATTORNEYS

May 18, 1965    A. E. WHITECAR    3,184,668
MASTER-SLAVE PLURAL MOTOR SYNCHRONIZING SYSTEM
Filed Feb. 28, 1963    2 Sheets-Sheet 2

INVENTOR.
ALTEN E. WHITECAR
BY
Busser, Smith & Harding
ATTORNEYS

United States Patent Office 3,184,668
Patented May 18, 1965

3,184,668
MASTER-SLAVE PLURAL MOTOR
SYNCHRONIZING SYSTEM
Alten E. Whitecar, Westville, N.J., assignor to Smith
Kline & French Laboratories, Philadelphia, Pa., a corporation of Pennsylvania
Filed Feb. 28, 1963, Ser. No. 261,653
2 Claims. (Cl. 318—75)

The present invention relates to a control system for synchronizing the operation of two machines which are independently driven by two separate motors the latter of which is subject to slight speed variations over extended periods of operation.

Although it is common practice to employ synchronous speed motors for achieving synchronous operation of a plurality of machines, the use of such motors is seriously limited by their relatively high cost as compared to non-synchronous motors. In addition, a synchronous speed motor system requires the use of a special signal source for providing a precise frequency-controlled power current to each of the motors and such signal sources further add to the high cost of the system. As a result, it is often economically impractical to employ this type of synchronizing system and there has long been a need for a synchronizing system which is compatible with the relatively less expensive non-synchronous motors. To this end, it has been proposed to employ non-synchronous drive motors and a pair of rotary switches driven by the machines for detecting speed variations between the machines and applying a correction signal to a variable speed gear unit located between one motor and its associated machine. Although this type of system is less expensive than those employing synchronous speed motors, the use of rotary switches is objectionable since such switches are subject to constant maintenance and repair due to the fact that their rotary contacts wear out after relatively short periods of use. Furthermore, such rotary switches are subject to short circuiting due to the build up of conductive particles from the brushes which tend to bridge the contacts. Most importantly, however, rotary switches are only operative to initiate a correction so long as the controlled machines remain within predetermined speed ranges and such systems do not permit the machines to be initially started unless the switches are in a particular phase relationship with respect to each other.

It is therefore a principal object of the present invention to provide a synchronizing system for operating two machines in a timed relationship wherein the system does not require either synchronous speed motor or rotary switches.

It is a further object of the present invention to provide a synchronizing system which permits the machines to be started and brought into synchronized operation regardless of the relative angular positions of the machine drive shafts when the machines are stopped.

It is yet another object of the present invention to provide a simplified and more economical synchronizing system which may be operated over extended periods of continuous use with a minimum of maintenance and repair.

In brief, the present invention achieves the foregoing objects by utilizing a plurality of cam actuated switches which sense the occurrence of non-synchronous operation of the machines and automatically energize appropriate relay circuitry so as to apply a correction signal to a differential transmission which re-synchronizes the operation of the two machines.

Figure 2:
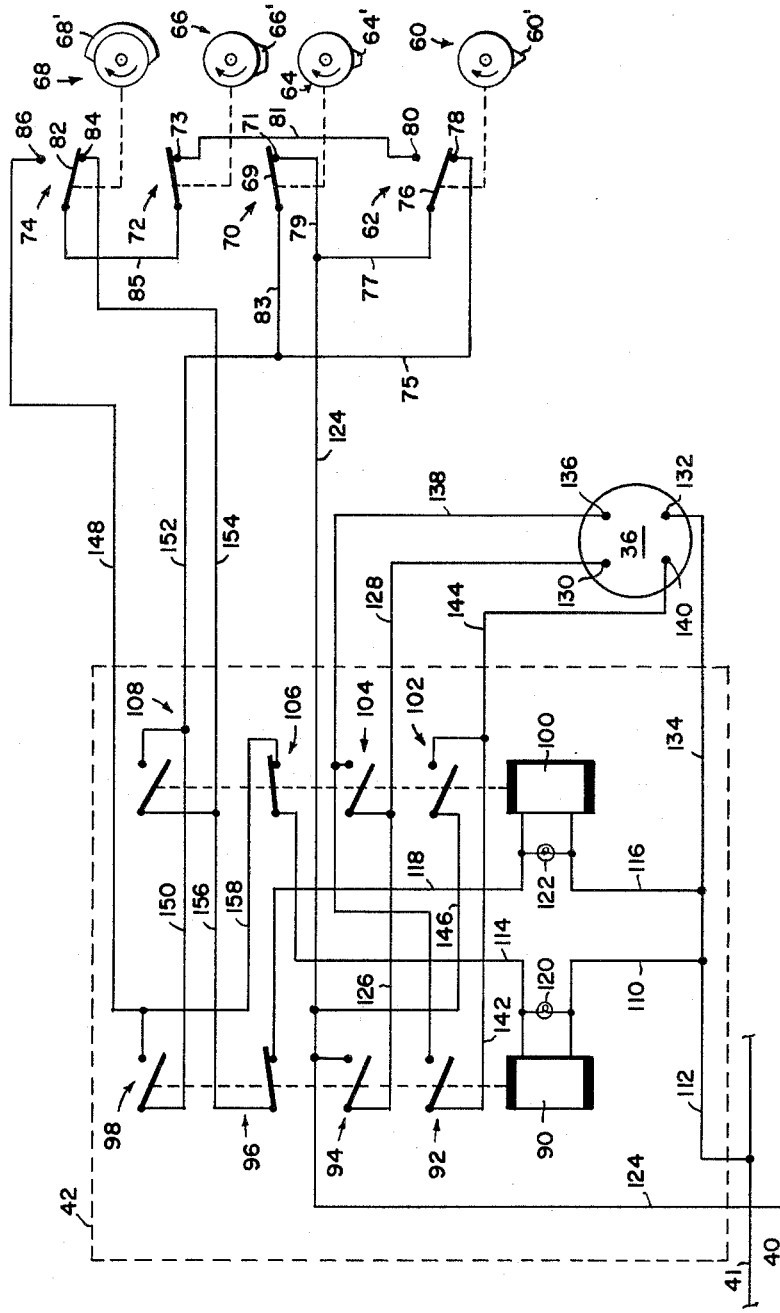

The above objects as well as others more particularly relating to the details of construction and operation will become more fully apparent from the following description taken in conjunction with the accompanying drawings in which:

FIGURE 1 is a schematic diagram of the complete system for synchronizing the operation of two machines which form a portion of an assembly line; and FIGURE 2 is a schematic diagram of the control circuitry forming a portion of the synchronizing system.

For purposes of describing the principles of the invention and one possible application thereof, FIGURE 1 illustrates the synchronizing system in combination with a pair of machines 10, 12 which form a portion of an assembly line for packaging pharmaceutical samples although it will readily be apparent that the synchronizing system is in no way limited to these particular types of machines. The illustrated portion of the assembly line further includes a first conveyor 14 which supplies empty sample packages 16 to the first machine 12. This machine is of the well known type for inserting capsules or tablets 18 into a plurality of empty pockets 20 provided in each of the sample packages. As each package is filled, machine 12 ejects the package into a chute 22 so that the preceding packages are pushed through the chute into the second machine 10. This machine is illustrated as being of the type which applies a cellophane wrapper to each of the sample packages and, in turn, ejects the packages through a chute 24 which conveys the packages to the next machine on the assembly line.

From the brief foregoing description of the machines it will be apparent that the two machines must operate not only at equal rates but also in synchronized cycles so that the packages are ejected simultaneously by both machines. That is, the operating cycles of the two machines must be maintained in phase with each other. Thus, the synchronizing system of the present invention is illustrated and described as adjusting the operation of machine 12, hereinafter referred to as the slave machine, such that its cycles of operation are maintained in phase with the operating cycles of machine 10, the latter machine being referred to as the master machine.

Again referring to FIGURE 1, master machine 10 includes an input drive shaft 11 directly driven by a first electric motor 26, whereas, slave machine 12 includes an input drive shaft 13 which is indirectly driven by a second electric motor 28 through a differential transmission 30. Transmission 30 includes a driving gear 31 secured to motor shaft 29 and a driven gear 32 secured to shaft 13. A plurality of pinion gears 33 rotatably mounted on an annular ring 34 interconnect gears 31 and 32. The side face of ring 34 is provided with teeth which mesh with a pinion 35 driven by a reversible servo motor 36. It will therefore be apparent that energization of motor 36 so as to rotate pinion 35 in one direction causes shaft 13 to be advanced relative to shafts 11 and 29, whereas, energization of motor 36 so as to rotate pinion 35 in the opposite direction causes shaft 13 to be retarded relative to shafts 11 and 29.

Power current for the energization of each of the above mentioned motors is supplied from power terminals 15 through an on-off switch 17. Motors 26 and 28 are connected directly to the switch through parallel pairs of power lines 38, 39 and 40, 41, whereas, servo motor 36 is indirectly connected to the switch through a relay circuit generally indicated by numeral 42.

At this point, it is to be understood that all of the above mentioned motors are of the non-synchronous speed type although they may be either A.C. or D.C. motors depending upon the requirements of the particular machines with which they are associated and the type of power sources most readily available. It will also be understood that motors 26 and 28 may be either constant-speed or variable-speed motors depending upon whether or not it is desirable to operate the assembly line at different rates at different times. In addition, it will be readily apparent that input drive shafts 11 and 13 of machines 10 and 12 may not necessarily have a 1:1 speed ratio when the operating cycles of the two machines are synchronized. Thus, it is to be remembered that it is the phase relationship between the operating cycles of the two machines which is to be controlled and that this is accomplished by advancing or retarding shaft 13 relative to shafts 11 and 29.

Referring now to FIGURES 1 and 2, the synchronizing system further includes a first cam shaft 48 driven from shaft 11 through a pair of reduction gears 50, 52 and a second cam shaft 54 driven from shaft 13 by a second pair of reduction gears 56, 58. The reduction ratios of gears 50–52 and 56–58 are selected such that cam shafts 48 and 54 rotate at equal speeds with respect to each other when the production rates of machines 10 and 12 are equal although, depending upon the internal mechanisms of the two machines, the speed ratio between input shafts 11 and 13 may not necessarily be a 1:1 ratio when the production rates of the two machines are equal. Thus, for example, if the internal machine mechanisms require shaft 13 to be driven at a speed which is twice the speed of shaft 11 in order to maintain equal operating rates of the two machines, then the reduction ratio of gears 56, 58 will be twice that of gears 50, 52.

Shaft 48 drives a single master cam 60 which is adapted to actuate the movable contact of a first switch 62. On the other hand, shaft 54 drives a set of three cams 64, 66 and 68 which are adapted to actuate the movable contacts of switches 70, 72 and 74, respectively.

Reference is now made to the right-hand portion of FIGURE 2 which illustrates the details of the above mentioned cams and their associated switches. Master cam 60 is provided with a relatively sharp cam lobe 60' which is operative to move contact 76 of switch 62 momentarily out of engagement with terminal 78 and into engagement with terminal 80 once per cam revolution. Terminal 80 is connected by lead 81 to the fixed terminal 73 of normally closed switch 72, whereas, terminal 78 is connected by leads 75 and 83 to the movable contact 69 of switch 70. Movable contact 76 of switch 62 is connected by leads 77 and 79 to fixed terminal 71 of switch 70 and it will be noted that each of leads 75 and 83 are also connected through a common lead 152 to a portion of the relay circuitry 42 as will be described subsequently in more detail.

Cam 64 is provided with a cam lobe 64' which is of slightly greater circumferential extent than the sharp cam lobe 60'. As a result, so long as the operating cycles of the two machines are synchronized, cam lobe 64' opens switch 70 slightly prior to the momentary movement of contact 76 and closes switch 70 slightly after the movement of contact 76. As will become more fully apparent in the subsequent description of operation, cam 64 functions to deenergize reversible motor 32 after a correction has been accomplished and is therefore referred to as the deenergizing cam.

Cam 66 is hereinafter referred to as the energizing cam and is provided with a cam lobe 66' the circumferential extent of which is slightly greater than that of cam lobe 64'. As a result, cam 66 is operative to open normally closed switch 72 for a time interval slightly in excess of the time interval during which switch 70 is opened by cam lobe 64'. That is, upon each revolution of shaft 54, switch 72 is opened slightly prior to the opening of switch 70 and closed subsequent to the closure of switch 70.

Switch 72 is connected in series with switch 74 through lead 85 so that the movable contact of switch 74 is connected to terminal 80 of switch 62 whenever switch 72 is closed. Thus, switch 72 is operative to disconnect switch 74 from switches 62 and 70 for an interval the length of which is determined by a circumferential extent of lobe 66'.

Referring now to cam 68, it will be noted that this cam is provided with a lobe portion 68' having a circumferential extent of 180° so that this cam is operative to move contact 82 of switch 74 into engagement with terminals 84 and 86 of switch 74 during successive halves of each revolution of cam shaft 54. As will be more fully explained hereinafter, cam 68 determines whether reversible motor 36 is to be driven in the forward or rearward direction in order to accomplish the proper correction and is hereinafter referred to as the direction control cam.

Reference is now made to the left-hand portion of FIGURE 2 which illustrates the details of the relay circuit 42. This circuit includes a first relay having a coil 90 which actuates four switches 92, 94, 96 and 98. These switches are illustrated in the positions which they occupy when coil 90 is not energized and it will be noted that switch 96 is normally closed, whereas, each of switches 92, 94 and 98 is normally open.

The relay circuit 42 further includes a second relay having a coil 100 which actuates four switches 102, 104, 106 and 108. These switches are also illustrated in the positions which they occupy when coil 100 is not energized and it will be noted that switch 106 is normally closed, whereas, each of switches 102, 104 and 108 is normally open. One end of coil 90 is connected by leads 110 and 112 to power line 41 and the other end of coil 90 is connected through lead 114 to the movable contact of normally closed switch 106. Since switch 106 opens upon energization of coil 100, this switch functions as an interlock so that coil 90 cannot be energized at the same time that coil 100 is energized. Similarly, one end of coil 100 is connected through leads 116 and 112 to power line 41 and the opposite end of coil 100 is connected through lead 118 to normally closed switch 96. Since switch 96 opens upon energization of coil 90, this switch also functions as an interlock to prevent energization of coil 100 whenever coil 90 is already energized. It will also be noted that a pair of indicator lamps 120 and 122 are connected in parallel across coils 90 and 100 so as to be illuminated whenever the respective coil is energized.

Switches 92, 94, 102 and 104 form the power circuit for reversible motor 36 and are connected to the motor as follows. The fixed terminal of switch 94 is connected through a portion of power lead 124 to power line 40 and the movable contact of switch 94 is connected through leads 126 and 128 to a first terminal 130 of motor 36. The common ground terminal 132 of motor 36 is connected through leads 134 and 112 to power line 41 so that, upon closure of switch 94, terminals 130 and 132 are connected in parallel across power lines 40 and 41.

The third motor terminal 136 is connected through lead 138 to the fixed terminal of switch 92 and the movable contact of this switch is connected back to the fourth motor terminal 140 via leads 142 and 144. Thus, upon energization of coil 90 and the consequent closure of switches 92 and 94, the internal field windings of motor 36 are connected to each other and to the power lines such that the motor will operate in a first direction. On the other hand, if coil 100 is energized, switches 102 and 104 perform the function of energizing motor 36 and it will become apparent that these switches connect the motor terminals so that motor 36 is energized to run in the opposite direction. That is, switch 102 is operative to connect motor terminal 140 to power line 40 through leads 144, 146 and 124, whereas, switch 104 is operative to interconnect motor terminals 130 and 136 through leads 128 and 138; the ground terminal 132 remaining connected to power line 41 through leads 134 and 112.

Reference is now made to switches 98 and 108 which establish holding circuits for retaining their respective coils in an energized condition throughout the period required to effect a correction. These switches are interconnected as follows. The fixed terminal of switch 98 is connected to the fixed terminal 86 of cam actuated switch 74 through lead 148. The movable contact of switch 98 and the fixed terminal of switch 108 are connected to switches 62 and 70 through leads 150, 152, 75 and 83. The movable contact of switch 108 is connected by lead 154 to fixed terminal 84 of switch 74 and this movable contact is also connected in series with interlock switch 96 through lead 156. Lastly, the fixed terminal of switch 98 is also connected in series with interlock switch 106 through lead 158.

The operation of the synchronizing system is as follows. First, it will be assumed that on-off switch 17 is closed so that motors 26 and 28 are supplied with power current and are driving machines 10 and 12 in phase with each other. So long as the machines remain in phase, shafts 48 and 54 will also be in phase and each of the cams will be in the relative position illustrated in FIGURE 2. That is, master cam lobe 60' will be aligned with the centers of cam lobes 64' and 66' as well as in alignment with the leading edge of cam lobe 68'. So long as this synchronized operation exists, neither of relay coils 90 or 100 will be energized due to the fact that switches 70 and 72 are both in open condition at the instant at which movable contact 76 engages terminal 80. Thus, the machines will continue to operate with synchronized operating cycles.

On the other hand, if the operating cycle of machine 12 tends to lag that of machine 10 due to a slight speed variation between motors 26 and 28, then cam 60 will be advanced relative to cams 64, 66 and 68 so that cam lobe 60' will cause movable contact 76 to engage terminal 80 before either of switches 70 or 72 are opened. At this instant, relay coil 100 will be initially energized since a closed circuit is established from power line 41 through leads 112, 116, coil 100, lead 118, normally closed switch 96, leads 156 and 154, switch 74, lead 85, closed switch 72, lead 81, movable contact 76, and leads 77 and 124 back to the other power line 40. Thus, coil 100 is initially energized and immediately closes each of switches 102, 104 and 108, whereas, switch 106 is opened. Opening of switch 106 positively prevents the subsequent energization of coil 90 since this switch is located in series with coil 90 through lead 114. Immediately upon the initial energization of coil 100, the closure of switch 108 establishes a first holding circuit which maintains coil 100 in energized condition even though switch 72 is subsequently opened. This holding circuit may be traced from power line 40 through leads 124 and 79, closed switch 70, and leads 83 and 152 to the fixed terminal of switch 108. The circuit then continues through the closed switch and through lead 156, closed switch 96 and lead 118 to coil 100 the opposite end of which remains connected to the other power line 41 through lead 116.

The above described holding circuit continues to energize coil 100 while contact 78 moves back in to engagement with terminal 78 and while switch 72 opens but before lobe 64' opens switch 70. Once, contact 76 again engages terminal 78, the continued rotation of cam 64 will eventually cause switch 70 to open and thereby destroy the above described holding circuit. However, a second holding circuit is established prior to this event since current may flow from power line 40, through leads 124 and 77, contact 76, terminal 78, leads 75 and 152, closed switch 108, lead 156, closed switch 96, lead 118, coil 100 and leads 116, 112 to the other power line 41. Thus, so long as cam lobe 60' is not aligned within the leading and trailing edges of cam lobe 64' so that switches 62 and 70 are not actuated simultaneously, the coil will remain energized through one or other of the two holding circuits just described.

Throughout the energization of coil 100 as just described, switches 102 and 104 are closed with the result that the terminals of motor 36 are connected in the following manner. Switch 102 establishes a current path from power line 40 through lead 124, lead 146, switch 102, and lead 144 to terminal 140 of the motor. The second motor terminal 132 is of course connected directly to the opposite power line 41 through leads 134 and 112. The third and fourth motor terminals 130 and 136 are connected directly to each other through leads 128, switch 104 and lead 138. As a result, motor 36 is energized so as to rotate pinion 35 in the forward direction and thereby advance the angular position of shaft 13 so as to re-synchronize the operating cycles of machine 12 with that of machine 10. Once the machines are again in phase, master cam lobe 60' will again be within the leading and trailing edges of cam lobes 64' and 66' at which time both of switches 62 and 70 are simultaneously actuated so that both holding circuits are destroyed and relay coil 100 is deenergized.

The foregoing description of operation has referred to those events which occur when machine 12 tends to lag machine 10; however, it will be apparent that the synchronizing system is equally operative to re-synchronize the machines if machine 12 tends to lead machine 10. In this event, master cam 60 will lag behind cams 64 and 66 such that movable contact 76 will engage terminal 80 after switches 70 and 72 have opened and reclosed and while movable contact 82 of switch 74 is in engagement with terminal 86 instead of terminal 84 as in the previous description. As a result, coil 90 will be initially energized since there will be a momentarily closed path from power line 41 through leads 112 and 110, coil 90, lead 114, closed switch 106, leads 158 and 148, terminal 86, contact 82, lead 85, closed switch 72, lead 81, terminal 80, contact 76, leads 77 and 124 back to the other power line 40. Thus, each of switches 92, 94 and 98 will be closed and interlocked switch 96 will be opened, the latter preventing the subsequent energization of coil 100 since it is connected in series therewith through lead 118. Immediately upon closure of switch 98, a first holding circuit is established from power line 40 through lead 124, lead 79, closed switch 70, leads 83, 152 and 150, closed switch 98, lead 158, closed switch 106, and lead 114 to coil 90 from which the current flows through leads 110 and 112 to the other power line 41. Of course, this holding circuit remains effective only so long as switch 70 remains closed. However, prior to the opening of switch 70, contact 76 again engages terminal 78 so that a second holding circuit is established from power line 40, through leads 124 and 77, contact 76, terminal 78, leads 75, 152 and 150, closed switch 98, lead 158, closed switch 106, lead 114, coil 90 and leads 110, 112 to power line 41. Therefore, so long as both of switches 62 and 70 are not actuated simultaneously, coil 90 will remain energized through one or other of the holding circuits just described.

During the energization period of coil 90, switches 92 and 94 interconnect the terminals of motor 36 as follows. Terminal 132 remains connected to power lead 41 through leads 134 and 112. Terminal 140 is connected to terminal 136 through leads 144, 142, switch 92 and lead 138. The remaining terminal 130 is connected to power line 40 through leads 128 and 126, switch 94 and lead 124. Thus, the field windings of motor 36 are connected in a reverse manner to that previously described so that pinion 35 rotates in the reverse direction. Rotation of pinion 35 in the reverse direction retards the angular position of shaft 13 relative to shafts 11 and 29 so that the operating cycles of the two machines are again synchronized as are cam shafts 48 and 54. Thus, the above described correction will be terminated when the machines are again synchronized due to the fact that cams 60 and 64 again actuate respective switches 62 and 70 at the same time so that both of the above described holding circuits are destroyed. Thus, upon deenergization of coil 90, motor 36 is deenergized and the correction is completed.

From the foregoing description of operation, it will be apparent that a correction will be initiated whenever cam 66 leads or lags behind cam 60 and that the correction will be terminated only when master cam 60 is again between the leading and trailing edge of cam 64. It will therefore be apparent that the two machines may be initially started regardless of the relative position of cam 60 with respect to the other cams and that the synchronizing system will bring the two machines into phased operation in the shortest possible time since the system will either advance or retard the operating cycle of the slave machine so as to match that of the master machine.

From the foregoing description it will also be apparent that numerous changes and/or modifications may be made without departing from the scope of the invention. For example, it will be obvious that cam shafts 48 and 54 may be connected to the internal mechanism of the respective machines rather than being connected to the input drive shafts as illustrated. Therefore, it is to be understood that the present description is intended to be merely illustrative of the principles of the invention and that the invention is not to be limited other than as specifically set forth in the following claims.

What is claimed is:

1. A synchronizing system for synchronizing the operating cycles of a slave machine and a master machine comprising a first motor for driving said master machine, a first cam arranged to be rotated by said first motor, a first switching means operable by said first cam, a differential transmission having its output shaft arranged to operate said slave machine, a second motor arranged to drive one input shaft of said differential transmission, second, third and fourth cams arranged to be rotated in response to rotation of said output shaft, second, third and fourth switching means operable by said second, third and fourth cams respectively, a reversible servomotor having its output shaft arranged to drive the other input shaft of said differential transmission, and fifth switching means operable to deliver power to said reversible servomotor selectively to operate said servomotor in either a forward or reverse direction, said fifth switching means being operable by said first and third switching means to deliver power to said servomotor when said third cam either leads or lags said first cam by a predetermined amount, said fifth switching means being operable to cause said servomotor to operate in forward direction when said fourth switching means is activated in one direction by said fourth cam and in a reverse direction when said fourth switching means is not activated by said fourth cam, and said fifth switching means being operable by said first and second switching means to remove operating power from said servomotor when said first and second cams are in phase coincidence.

2. A synchronizing system for synchronizing the operating cycles of a slave machine and a master machine comprising a first motor for driving said master machine, a first cam arranged to be rotated by said first motor, a first switching means operable by said first cam, a differential transmission having its output shaft arranged to operate said slave machine, a second motor arranged to drive one input shaft of said differential transmission, second, third and fourth cams arranged to be rotated in response to rotation of said output shaft, second, third and fourth switching means operable by said second, third and fourth cams respectively, a reversible servomotor having its output shaft arranged to drive the other input shaft of said differential transmission, and fifth switching means operable to deliver power to said reversible servomotor selectively to operate said servomotor in either a forward or reverse direction, said fifth switching means being operable by said first and third switching means to deliver power to said servomotor when said third cam either leads or lags said first cam by a first predetermined amount, said fifth switching means being operable to cause said servomotor to operate in a forward direction when said fourth switching means is activated in one direction by said fourth cam and in a reverse direction when said fourth switching means is not activated by said fourth cam, and said fifth switching means being operable by said first and second switching means to remove operating power from said servomotor when said second cam either leads or lags said first cam by a second predetermined amount, said second predetermined amount being smaller than said first predetermined amount.

References Cited by the Examiner

UNITED STATES PATENTS

| 1,941,955 | 1/34 | Rondot | 318—75 X |
| 2,316,015 | 4/43 | Owens et al. | 318—75 X |
| 2,481,126 | 9/49 | Laws | 318—41 X |
| 2,506,766 | 5/50 | Bartelink | 318—85 X |
| 2,929,974 | 3/60 | Wells | 318—13 X |

FOREIGN PATENTS

| 157,155 | 9/32 | Switzerland. |

ORIS L. RADER, *Primary Examiner.*